United States Patent
Grellier et al.

[15] 3,664,916
[45] May 23, 1972

[54] POLYAMIDE-BASED COMPOSITE FILAMENTS

[72] Inventors: Rene Grellier, Chavanoz (Isere); Claude Guyot, Besancon (Doubs), both of France

[73] Assignee: Societa Rhodiaceta, Paris, France

[22] Filed: Nov. 19, 1969

[21] Appl. No.: 878,184

[30] Foreign Application Priority Data

Sept. 25, 1969 France...................................6932801

[52] U.S. Cl..............................161/173, 161/175, 161/177, 264/171
[51] Int. Cl.........................................................D02g 3/02
[58] Field of Search.................161/173, 175, 177; 260/78 R; 264/171, DIG. 26

[56] References Cited

UNITED STATES PATENTS 3,393,210  7/1968  Speck....................................260/78 R
3,526,571  9/1970  Ogata......................................161/175

*Primary Examiner*—Robert F. Burnett
*Assistant Examiner*—Linda C. Koeckert
*Attorney*—Stevens, Davis, Miller & Mosher

[57] ABSTRACT

A composite yarn comprising hexamethylene diamonium polyadipate or polyhescamethylene adipamide and a copolyamide prepared from hexamethylene diamonium adipate and a salt derived from a diacid containing six to 12 carbon atoms and a cycloalkane diamine has a latent crimp and is suitable for use in the manufacture of woven fabrics, knitted fabrics or carpets.

7 Claims, No Drawings

POLYAMIDE-BASED COMPOSITE FILAMENTS

The present invention relates to composite yarns comprising two polyamides having different shrinkage properties.

Composite yarns, obtained by extruding at least two polymers, either of a similar or dissimilar nature and of different shrinkage potentials, through the same spinneret hole, have a latent crimp which can be developed after stretching by heat treatment in the relaxed state. The use of such composite yarns has met with an enormous success in the field of textiles, in particular in use in hosiery, woven fabrics and carpets.

However, to obtain sufficiently elastic articles it is necessary to use, as the two components, polymers having very different shrinkage potentials, such as polymers of different chemical nature but these do not adhere sufficiently to each other and finally separate during use, which is obviously harmful to the appearance and quality of the articles made from them.

To overcome these disadvantages yarns formed from two polyamides fulfilling certain crystallization criteria have been proposed. These composite yarns are prepared from a crystalline homopolyamide, for example a polyamide produced from hexamethylenediamine and adipic acid, and a crystallizable non-isomorphous copolyamide containing at least 20 percent by weight of each of its polymer units, for example a copolymer produced from hexamethylenediamine, adipic acid, and sebacic acid. Since a high proportion of additional monomer is needed to produce a non-isomorphous copolymer, the melting points of the two polymers, to be simultaneously extruded, are significantly different. This results in certain difficulties in spinning and in some filaments becoming stuck together during winding-up, especially in the case of fine gauges.

The present invention provides a composite yarn which comprises hexamethylene diamonium polyadipate or polyhexamethylene adifamide and a copolyamide prepared from hexamethylene diammonium adipate and a further salt derived from a diacid containing six to 12 carbon atoms and a cycloalkane diamine of the formula:

$$NH_2—R—NH_2$$

wherein R represents

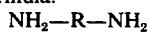

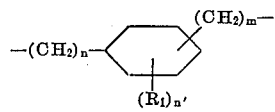

or

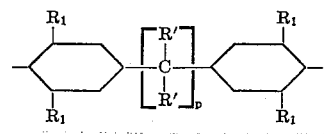

wherein $m$ is an integer from 1 to 4, $n$ and $n'$ are 0 or integers from 1 to 4, $R_1$ is H, $CH_3$ or $C_2H_5$, $R'$ is H, $CH_3$, $C_2H_5$ or a cyclohexyl radical and $p$ is an integer from 1 to 6, said further salt being used in an about of 5 to 20 percent, preferably 5 to 10 percent by weight based on the total weight of salts.

When these diamines have structural isomers, they can be used either pure or as an isomer mixture.

The diacids which can be used are aliphatic diacids containing six to 12 carbon atoms, in particular adipic, sebacic or dodecanedioic acid.

Suitable diamines include for example bis(4-aminocyclohexyl)methane, 3-aminomethyl-3,5,5-trimethyl-cyclohexylamine-1, 2,2-bis-(4-aminocyclohexyl)propane, 2,2-bis(4-amino-3-methyl-cyclohexyl)propane and p-hexahydroxylylenediamine.

The preparation of the copolyamides used in the yarns of this invention and that of the monomers, from which they are produced, are in themselves known.

The hexamethylene diamonium polyadipate and the copolyamide are preferably present in the yarn in a proportion of substantially 1:1 by weight.

This new composite yarn may be produced without difficulty by simultaneous spinning of the two constituents, the filaments have only a very slight tendency to stick together during winding up.

The softening point of the copolyamide is only slightly below that of the hexamethylenediamine polyadipate. This is of great advantage during the spinning operation and improves the quality of the textile products obtained.

The constituents possess good adhesion towards each other, so that the yarn remains well-coherent and possesses an excellent fine and regular crimp after heat development. As a result satisfactory textile articles having a good surface appearance and constant strength properties may be produced from these yarns.

Furthermore, in view of the small amount of additional monomer used to prepare the copolyamide the cost price of the yarn is significantly reduced in comparison with that of previously known yarns. The addition of such small amounts of monomer as cycloalkane diamines of the defined kind means that it is possible to retain, in the copolymer, the maximum number of hexamethylenediamine polyadipate units, which are known to impart a high crystallizability to the polymer.

The crystallization properties of the copolyamides may be studied by measuring the heat of crystallization and the crystallization temperature by differential enthalpy analysis under nitrogen, employing a temperature increase of 8° C per minute, with prior melting-quenching of the sample. Thus the temperatures corresponding to the start, to the top and to the end of the crystallization peak can be observed. The surface area of the peak, which is proportional to the degree of crystallization, is related to a weight of 10 mg of polymer.

The use of a copolyamide having a high degree of crystallization improves the mechanical properties of the composite yarn and the intensity and quality of the crimp.

These yarns are obtained in the usual manner by simultaneous extrusion of two polymers, alongside one another or in the form of a non-concentric core and sheath, through the same spinneret hole, the ratio of the output rates is preferably essentially 1:1 but may drop to 1:3 to give a ratio of hexamethylene diamonium polyadipate to copolyamide of 1:3 by weight. The yarn is then stretched over an optionally heated rod and the crimp developed by a heat treatment, for example a boiling water treatment of the yarn in the free state or of an article produced from this yarn, using any known apparatus.

The development of the crimp is preferably carried out in two stages. During the first stage the crimp is partially developed by the action of a hot gas passed over the relaxed yarn directly after stretching. The second stage consists of dipping any textile article produced from the yarn treated in this way into boiling water. This operation can advantageously correspond to the dyeing operation.

The crimp obtained may be characterized by the extensibility of the yarn and by the half-decrimping and half-recrimping forces, these forces result from the yarns resistance to decrimping. It is in effect this resistance to decrimping which is directly involved during handling or in use, for example in a knitted fabric, when the yarn has to overcome the frictional forces to cancel out the effects of a transient deformation.

The extensibility is given by the relationship
$$E\% = (L - 1)/1 \times 100$$
in which $L$ represents the length of the decrimped yarn under a tension of 225 mg/dtex, and 1 represents the length of the crimped yarn under no tension.

From a force/elongation diagram for the range 1 to $L$, the half-decrimping and half-recrimping forces are read off as the ordinate for $E\%/2$ plotted as the abscissa. It is found that these forces are infinitely weaker than the force required for complete decrimping.

The new composite yarns according to the invention can be used in the manufacture of woven fabrics, knitted fabrics and carpets but are especially useful in the field of hosiery where they make it possible to produce articles with good wearing properties.

The following examples illustrate the invention.

EXAMPLE 1

Hexamethylenediamine diammonium polyadipate and a copolyamide produced from 80 percent by weight of hexamethylenediammonium adipate and 20 percent by weight of bis-(4-aminocyclohexyl)-methane adipate, based on the total weight of hexamethylenediammonium adipate and di(4-aminocyclohexyl)-methane adipate, are extruded alongside one another in a 1:1 weight ratio at 290° C, simultaneously and at the same throughput rate, through the same holes of a spinneret having 24 holes, using a conventional melt spinning device.

On issuing from the spinneret the yarns are passed into a cooling atmosphere and are then would up at a speed of 900 m/minute.

They are then stretched at ambient temperature to a ratio of 3.1 by being passed at a speed of 480 m/minute over a 6 mm diameter stretching rod. They then display the following properties:
 Total titre (dtex): 78
 Tensile strength (g/dtex): 4.32
 Elongation at break (%): 27.2

The composite yarns prepared in this way possess a latent crimp which is developed, when the yarns are in the free state in boiling water. The crimp obtained is characterized by a yarn extensibility of 170 percent, a half-decrimping force of 11.34 mg/dtex and a half-recrimping force of 5.31 mg/dtex.

EXAMPLE 2

Hexamethylene diamonium polyadipate and a copolyamide produced from 83 percent by weight of hexamethylenediammonium adipate and 17 percent by weight of bis-(4-aminocyclohexyl)-methane sebacate, based on the total weight of hexamethylenediammonium adipate and di(4-aminocyclohexyl)-methane sebacate, are spun simultaneously in a 1:1 weight ratio and at the same throughput rate, in the same manner as described in Example 1 except that a spinneret having 10 holes is used.

The composite monofilaments obtained are wound up at a speed of 420 m/minute and are then stretched at ambient temperature to a ratio of 4.28 on a rod 8 mm in diameter, at a speed of 720 m/minute, and the crimp is developed by treatment with boiling water, the yarn being kept in the free state.

The yarns display the following properties:
 Titre (dtex): 19
 Tensile strength (g/dtex): 5.22
 Elongation at break (%): 34.8
 Extensibility (%): 142
 Half-decrimping force (mg/dtex): 6.12
 Half-recrimping force (mg/dtex): 2.34

The yarns are used in the manufacture of stockings which exhibit good elasticity and which mold well to the leg.

EXAMPLE 3

Hexamethylenediamonium polyadipate and a copolyamide derived from 90 percent by weight of hexamethylenediammonium adipate and 10 percent by weight of 3-aminomethyl-3,5,5-tremethyl-cyclohexylamine-1 adipate, based on the total weight of hexamethylenediammonium adipate and 3-aminomethyl-3,5,5-trimethylcyclohexylamine-1 adipate, are extruded simultaneously in a 1:1 weight ratio and at the same throughput rate, at 292° C, through the same holes of a spinneret having 30 holes. After cooling the composite yarns obtained are wound up at a speed of 300 m/minute and are then stretched 4.6-fold by being passed at 240 m/minute over a rod heated to 70° C. The crimp of the yarn is developed by treating the yarn, in the free state, with boiling water. It then has the following properties:
 Total titre (dtex): 550
 Tensile strength (g/dtex): 4.77
 Elongation at break (%): 36.3
 Extensibility (%): 85
 Half-decrimping force (mg/dtex): 8.01
 Half-recrimping force (mg/dtex): 5.31

EXAMPLE 4

A composite yarn is prepared in the same manner and from the same polymers as described in Example 3 and a crimp of about 40 percent is developed immediately after stretching by passing the yarn issuing from the stretching roller across a stream of gas heated to about 200° C.

A tufted carpet is produced by known methods from a yarn with four ends they treated and in which the crimp has been developed by dyeing.

The carpet obtained has excellent uniformity and good dyeing affinity.

EXAMPLES 5 TO 9

Hexamethylenediamonium polyadipate and a copolymer produced from hexamethylenediammonium adipate and a salt of a diacid containing six to 12 carbon atoms and a bi-cycloaliphatic diamine are simultaneously extruded alongside one another at 290° C in a 1:1 weight ratio through the same holes of a spinneret having 24 holes, and at the same throughput rate, using a conventional melt spinning device.

On issuing from the spinneret the yarns are passed into a cooling atmosphere and are then wound up at a speed of 900 m/minute.

They are then stretched at ambient temperature to a ratio of 3.1 by being passed at a speed of 480 m/minute over a stretching rod 6 mm in diameter.

The composite yarns prepared in this way possess a latent crimp which is developed by treating yarns in the free state with boiling water.

Several samples of yarns having a total titre of 78 dtex are thus prepared. The properties of the copolyamides used are shown in Table I, in which the symbols have the following significance:

VF = viscosity in the molten state, measured according to standard specification ASTMD–1238 62 T, at 285° C instead of 275° C, after 15 minutes melting.

VR = relative viscosity measured at 25° C on an 8.4 percent solution in 90 percent formic acid.

GT − COOH = number of terminal COOH groups per $10^6$ g of polymer.

GT − $NH_2$ = number of $NH_2$ groups per $10^6$ g of polymer.

PR = top of the melting peak in the differential enthalpy analysis curves, under the conditions defined above.

TABLE 1

| Examples | 5 | 6 | 7 | 8 | 9 |
|---|---|---|---|---|---|
| Nature of the bi-cycloaliphatic diamine | Bis-(4-aminocyclohexyl)-methane | | 2,2-bis-(4-aminocyclohexyl)-propane | | 2,2-bis-(4-amino-3-methyl-cyclohexyl)-propane. |
| Proportion of stereoisomers (percent) | 73% transtrans-isomer, 27% cis-trans plus cis-cis isomer. | 100% trans-trans isomer. | 65.5% trans-trans isomer, 32% cis-trans isomer, 2.5% cis-cis isomer | | |
| Nature of the diacid | | | Dodecanedioic acid | | Adipic acid. |
| Percentage by weight of salt produced from the bi-cycloaliphatic diamine and the diacid, in the total amount of hexamethylenediammonium adipate and salt of the diacid and diamine. | 20 | 20 | 20 | 10 | 10. |
| VF (poises) | 1,176 | 1,060 | 790 | 970 | 740. |
| VR | 37.2 | 38.1 | 30.2 | 32.2 | 28.9. |
| GT-COOH | 73 | 69 | 66 | 63 | 75. |
| GT-$NH_2$ | 51 | 52 | 53 | 51 | 31. |
| PR (° C.) | 240 | 240 | 240 | 252 | 258. |
| Crystallisation temperature (° C.) | 79 | 78 | 86 | 71 | 75. |
| Area of the crystallisation peak (mm.$^2$) | 460 | 420 | 550 | 370 | 335. |

The properties of the crimped yarns obtained are shown in Table II below:

TABLE II

| Examples | 5 | 6 | 7 | 8 | 9 |
|---|---|---|---|---|---|
| Extensibility (%) | 191 | 210 | 211 | 178 | 127 |
| Half-decrimping force (mg/dtex) | 4.8 | 6.2 | 10.4 | 2.5 | 2.5 |
| Half-recrimping force (mg/dtex) | 2.2 | 2.7 | 3.2 | 1.2 | 1.2 |
| Strength (g/dtex) | 3.89 | 4.04 | 3.79 | 2.99 | 4.16 |
| Elongation (%) | 34.9 | 30.5 | 34.2 | 30.9 | 31.1 |

EXAMPLE 10

Hexamethylenediamine polyadipate and a copolyamide produced from 80 percent by weight of hexamethylenediammonium adipate and 20 percent by weight of salt produced from adipic acid and p-hexahydroxylylenediamine in the form of the pure trans isomer are spun simultaneously in the manner as described in Examples 5 to 9.

The properties of the copolyamide used are shown in Table III below:

TABLE III

| VR | 42 |
|---|---|
| GT-COOH | 78 |
| GT-NH$_2$ | 38 |
| PR (°C) | 250 |
| Crystallization temperature (°C) | 74 |
| Area of the crystallization peak, mm$^2$ | 420 |

VR, GT-COOH, GT-NH$_2$ and PR have the significance indicated in Table I.

After being subjected to stretching and heat treatment, the yarn obtained has an attractive crimp and good strength and can be used for the manufacture of textile articles.

We claim:

1. A composite filament which consists essentially of a first component of hexamethylene diamonium polyadipate and a second component of a copolyamide prepared from hexamethylene diammonium adipate and a further salt derived from a diacid containing six to 12 carbon atoms and a cycloalkane diamine of the formula:

$$NH_2—R—NH_2$$

wherein R represents

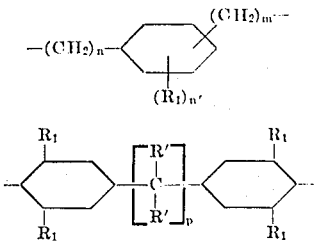

wherein $m$ is an integer from 1 to 4, $n$ and $n'$ are 0 or integers from 1 to 4, $R_1$ is H, $CH_3$ or $C_2H_5$, $R'$ is H, $CH_3$, $C_2H_5$ or a cyclohexyl radical and p is an integer from 1 to 6, said further salt being used in an amount of 5 to 20 percent, by weight based on the total weight of salts.

2. A composite filament according to claim 1, wherein the further salt is used in an amount of 5 to 10 percent by weight based on the total weight of salts.

3. A composite filament according to claim 1, wherein the diacid is adipic, sebacic or dodicanedioic acid.

4. A composite filament according to claim 1, wherein the diamine is bis-(4-aminocyclohexyl)methane, 3-aminomethyl-3,5,5-trimethyl-cyclohexylamine, 2,2-bis-(4-aminocyclohexyl)propane, 2,2-bis-(4-amino-3-methyl-cyclohexyl)propane or p-hexahydroxylylenediamine.

5. A composite filament according to claim 1, wherein the further salt is bis(4-aminocyclohexyl)methane adipate, bis(4-aminocyclohexyl)methane sebacate, 3-aminomethyl-3,5,5-trimethylcyclohexylamine-1 adipate, bis(4-aminocyclohexyl)methane dodecanedioate, 2,2-bis-(4-aminocyclohexyl)propane dodecanedioate, 2,2-bis-(4-amino-3-methylcyclohexyl)propane adipate or p-hexahydroxylylenediamine adipate.

6. A composite filament according to claim 1, wherein the hexamethylene diamonium polyadipate and the copolyamide are substantially in the proportion of 1:1 by weight.

7. A composite filament according to claim 1, wherein the copolyamide is highly crystalline.

* * * * *

UNITED STATES PATENT OFFICE
CERTIFICATE OF CORRECTION

Patent No. 3,664,916                     Dated May 23, 1972

Inventor(s) Rene Grellier et al.

It is certified that error appears in the above-identified patent and that said Letters Patent are hereby corrected as shown below:

In the heading:

Under "Foreign Application Priority Date" add
-- November 21, 1968  France  174,737 --.

Column 3, line 59, "3,5,5-tremethyl-cyclohexylamine-1" should read -- 3,5,5-trimethyl-cyclohexylamine-1 --. Column 4, line 25, "they" should read -- thus --. Column 5, line 20, after "by weight of" and before "salt" insert -- a --.

Signed and sealed this 14th day of January 1975.

(SEAL)
Attest:

McCOY M. GIBSON JR.
Attesting Officer

C. MARSHALL DANN
Commissioner of Patents